United States Patent
Hale et al.

(10) Patent No.: US 11,048,708 B2
(45) Date of Patent: Jun. 29, 2021

(54) SOCIAL DISCOVERY AND RANKING OF PAGES

(71) Applicant: Facebook, Inc., Menlo Park, CA (US)

(72) Inventors: Brian Piepgrass Hale, Mountain View, CA (US); Rohit Dhawan, London (GB); Nicolas Andrij Bushak, San Francisco, CA (US); Thomas Giovanni Carriero, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 665 days.

(21) Appl. No.: 15/640,832

(22) Filed: Jul. 3, 2017

(65) Prior Publication Data

US 2017/0300496 A1   Oct. 19, 2017

Related U.S. Application Data

(63) Continuation of application No. 14/562,958, filed on Dec. 8, 2014, now Pat. No. 9,697,260, which is a continuation of application No. 13/339,258, filed on Dec. 28, 2011, now Pat. No. 8,935,261.

(51) Int. Cl.
| | |
|---|---|
| *G06F 17/00* | (2019.01) |
| *G06F 7/00* | (2006.01) |
| *G06F 16/2457* | (2019.01) |
| *G06F 16/9535* | (2019.01) |
| *H04L 12/18* | (2006.01) |

(52) U.S. Cl.
CPC .... *G06F 16/24578* (2019.01); *G06F 16/9535* (2019.01); *H04L 12/1813* (2013.01)

(58) Field of Classification Search
CPC ................................................ G06F 17/30902

USPC ........................................................ 707/748
See application file for complete search history.

(56) References Cited

U.S. PATENT DOCUMENTS

| | | | | |
|---|---|---|---|---|
| 7,472,110 | B2 * | 12/2008 | Achlioptas | G06F 16/9535 707/999.003 |
| 7,606,168 | B2 * | 10/2009 | Robinson | G06Q 10/10 370/254 |
| 7,644,146 | B2 * | 1/2010 | Huberman | G06Q 10/10 709/223 |
| 7,756,534 | B2 * | 7/2010 | Anupam | H04W 4/23 455/466 |
| 8,099,316 | B2 * | 1/2012 | Moukas | G06Q 30/02 705/7.29 |

(Continued)

*Primary Examiner* — Pavan Mamillapalli
(74) *Attorney, Agent, or Firm* — Baker Botts L.L.P.

(57) ABSTRACT

In one embodiment, a computing device of a network environment may receive a search query comprising location parameters. The computing device may identify locations matching the search query. The computing device may access a particular record corresponding to the location, wherein the record indicates actions by users performed on the network environment with respect to the location. The computing device may determine, for each identified location, one or more counts of one or more types of actions. The computing device may generate a search-results page comprising references corresponding to the identified locations. Each reference may display the determined counts for the respective identified location. The references may be listed in ranked order based at least in part on their respective counts. The computing device may send to a client device of a user instructions for presenting the search-results page to the user.

20 Claims, 5 Drawing Sheets

(56) References Cited

U.S. PATENT DOCUMENTS

| | | | | |
|---|---|---|---|---|
| 8,107,973 B1 * | 1/2012 | Sjothun | | G01C 21/20 455/456.3 |
| 8,200,247 B1 * | 6/2012 | Starenky | | G06F 16/9537 455/456.3 |
| 8,275,870 B2 * | 9/2012 | Czyzewicz | | G06Q 30/02 709/223 |
| 8,402,023 B2 * | 3/2013 | Sheehan | | G06F 16/24575 707/728 |
| 8,566,030 B1 * | 10/2013 | Demiryurek | | G01C 21/3476 701/426 |
| 8,627,268 B2 * | 1/2014 | Lee | | G06F 9/451 717/100 |
| 8,630,627 B2 * | 1/2014 | Davitz | | G06F 16/90335 455/414.1 |
| 8,700,540 B1 * | 4/2014 | Zambrano | | G06F 16/24578 705/319 |
| 9,002,936 B2 | 4/2015 | Piepgrass | | |
| 9,202,233 B1 * | 12/2015 | Siegel | | G06Q 30/0252 |
| 9,220,985 B1 * | 12/2015 | Auterio | | A63F 13/27 |
| 2002/0086676 A1 | 7/2002 | Hendrey | | |
| 2003/0004743 A1 * | 1/2003 | Callegari | | G06Q 30/02 705/1.1 |
| 2003/0004802 A1 * | 1/2003 | Callegari | | G06Q 30/0259 705/14.13 |
| 2005/0219044 A1 * | 10/2005 | Douglass | | G08B 25/00 340/506 |
| 2009/0292549 A1 * | 11/2009 | Ma | | G06K 9/00677 705/319 |
| 2009/0310768 A1 * | 12/2009 | Hansen | | H04M 3/436 379/201.02 |
| 2010/0185509 A1 * | 7/2010 | Higgins | | G06F 16/951 705/14.49 |
| 2010/0217645 A1 | 8/2010 | Jin | | |
| 2011/0082746 A1 * | 4/2011 | Rice | | H04W 4/21 705/14.56 |
| 2012/0095998 A1 * | 4/2012 | Sheehan | | G06F 16/24575 707/728 |
| 2012/0203640 A1 | 8/2012 | Karmarkar | | |

\* cited by examiner

SOCIAL DISCOVERY AND RANKING OF PAGES

PRIORITY

This application is a continuation under 35 U.S.C. § 120 of U.S. patent application Ser. No. 14/562,958, filed 8 Dec. 2014, which is a continuation of U.S. patent application Ser. No. 13/339,258, filed 28 Dec. 2011, issued as U.S. Pat. No. 8,935,261 on 13 Jan. 2015, each of which is incorporated herein by reference.

TECHNICAL FIELD

This disclosure generally relates to social graphs.

BACKGROUND

A social-networking system, such as a social-networking website, enables its users to interact with it and with each other through the system. The social-networking system may create and store a record, often referred to as a user profile, in connection with the user. The user profile may include a user's demographic information, communication channel information, and personal interests. The social-networking system may also create and store a record of a user's relationship with other users in the social-networking system (e.g., social graph), as well as provide services (e.g., wall-posts, photo-sharing, event organization, messaging, games, or advertisements) to facilitate social interaction between users in the social-networking system. The social-networking system may transmit contents and messages related to its services to a user's client device over a network.

DESCRIPTION OF EXAMPLE EMBODIMENTS

Figure 1:
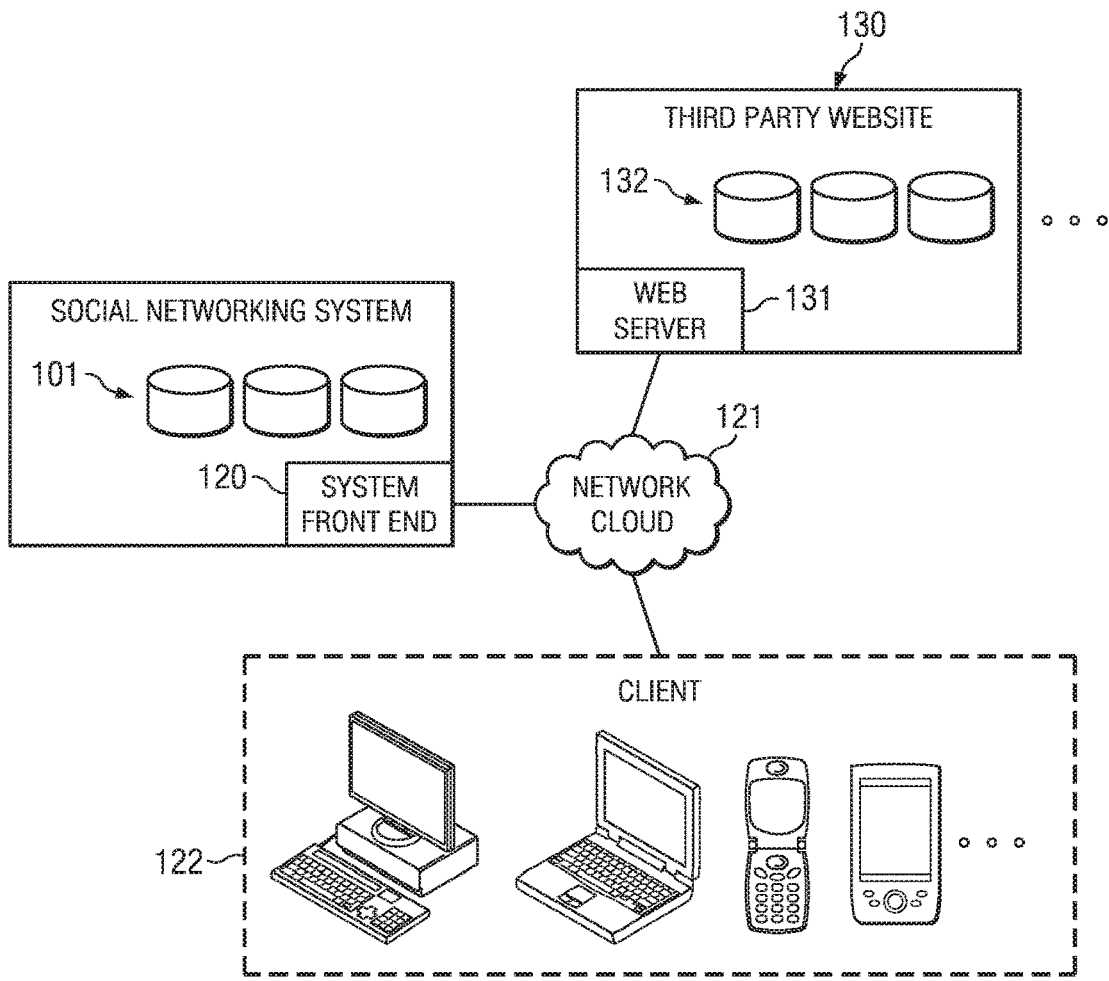
FIG. 1 illustrates an example network environment of an example social-networking system.

FIG. 1 illustrates an example network environment of an example social-networking system. In particular embodiments, a social-networking system may comprise one or more data stores 101. As an example and not by way of limitation, the social-networking system may store user-profile data and social-graph information in data stores 101. In particular embodiments, each data store 101 may comprise one or more storage devices. In particular embodiments, the social-networking system may comprise one or more computing devices (such as, for example, servers) hosting functionality directed to operation of the social-networking system. In particular embodiments, one or more of data stores 101 may be operably connected to the social-networking system's front end 120. As an example and not by way of limitation, front end 120 may be implemented in software programs hosted by one or more computing devices of the social-networking system. A user of the social-networking system may access the social-networking system using client device 122. In particular embodiments, front end 120 may interact with client device 122 through network cloud 121. Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which client devices 122 may access the social network system. In particular embodiments, client device 122 may be a computer or computing device including functionality for communicating (e.g., remotely) over a computer network. As an example and not by way of limitation, client device 122 may be a desktop computer, laptop computer, personal digital assistant (PDA), in- or out-of-car navigation system, smart phone or other cellular or mobile phone, mobile gaming device, another suitable computing device, or two or more such computing devices. In particular embodiments, client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. In particular embodiments, front end 120 may include web or HTTP server functionality, as well as other functionality, to allow users to access the social-networking system.

In particular embodiments, users of a social-networking system may access other websites or third-party websites (e.g., ESPN.com, www.youtube.com). As an example and not by way of limitation, a user using client device 122 may connect to and communicate with third-party website 130 through network cloud 121. Third-party website 130 may comprise web server 131 operatively connected to one or more data stores 132 storing user data and webpage information. User data may include, for example, user name, user profile picture, and user profile information (e.g., location, affiliation, interest). Webpage information may include, for example, page-layout information, scripts, webpage content such as text (e.g., ASCII or HTML), media data (e.g., graphics, photos, video clips), and executable code objects (e.g., a game executable within a browser window or frame). In particular embodiments, a user may use a web browser or special-purpose client application hosted on client device 122 to access their party website 130 by sending an HTTP request to web server 131, causing web server 131 to access the one or more data stores 132 and construct one or more webpages or frames displayed in the web browser or the special-purpose client application.

A social-networking system may communicate and access third-party website 130, and vise versa, through network cloud 121. As an example and not by way of limitation, a webpage constructed by third-party website 130 for a user of a social-networking system may contain information from the social-networking system, such as a frame displaying profile pictures of the user's first-degree friends who are currently active on third-party website 130. As an example and not by way of limitation, a user's user-profile page of a social-networking system may contain an embedded video clip that the user posted on third-party website 130. In particular embodiments, a webpage constructed by a first website may include one or more inline references that cause the client device 122 to access and display content from a second website by incorporating in the webpage's HTML document Uniform Resource Locations (URLs) and/or script code (e.g., JavaScript, PHP, AJAX) that causes a client application hosted on the client device 122 to access the second website to dynamically provide content specified by the script code (e.g., profile pictures). In particular embodiments, a browser cookie installed by a second website on client device 122 may be used to facilitate accessing the second website. As an example and not by way of limitation, requests transmitted to the social-networking system for a particular user may include a browser cookie or other token to enable authentication and access to the social-networking system for the particular user (such as, for example, to access and display profile pictures of the particular user's first-degree friends), without the particular user having to manually enter user identification (ID) and password information of the social-networking system.

Figure 2:
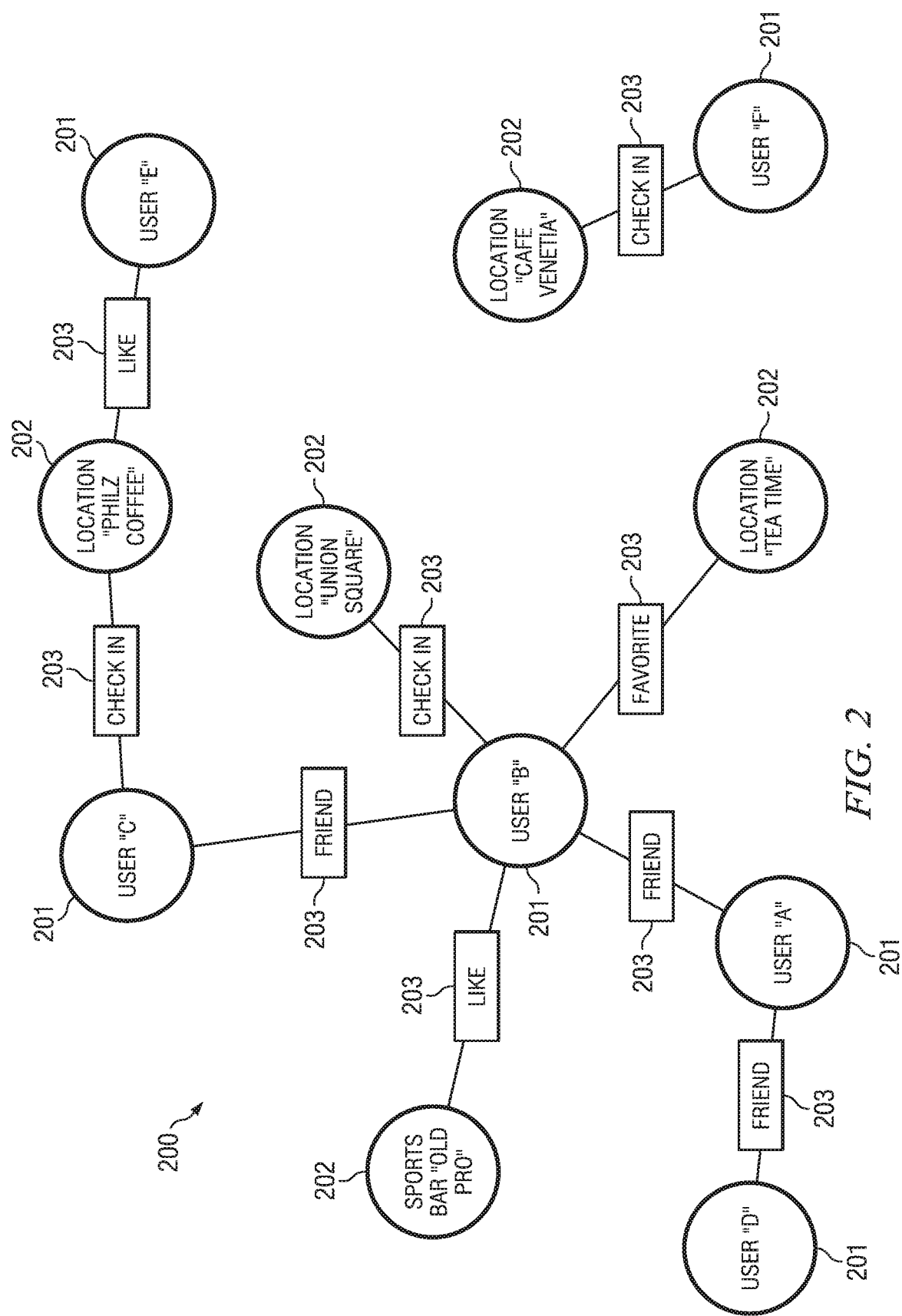
FIG. 2 illustrates an example social graph.

A social-networking system may store records of users and relationships between users in one or more social graphs. FIG. 2 illustrates an example social graph 200. In particular embodiments, the social-networking system may store social graph 200 in data stores 101. In particular embodiments, social graph 200 may comprise a plurality of user nodes 201, a plurality of location nodes 202, and a plurality of edges 203 between nodes.

In particular embodiments, each user node 201 may correspond to a user of the social-networking system. As an example and not by way of limitation, when a user registers for an account with the social-networking system, the social-networking system may create a user node 201 corresponding to the user, and store the user node 201 in one or more data stores 101. In particular embodiments, the user node 201 may comprise information provided by the user and information gathered by various systems, including the social-networking system. As an example and not by way of limitation, the user may provide his name, profile picture, contact information, birth date, gender, marital status, family status, employment, education background, preferences, interests, or other demographical information to be included in the user node 201. In particular embodiments, each user node 201 may comprise one or more data objects corresponding to information associated with a user. In particular embodiments, each user node 201 may correspond to one or more webpages or one or more user profile pages. As an example and not by way of limitation, in response to a request including a user identifier of a particular user, system front end 120 may access a corresponding user node based on the user identifier, and construct a user-profile page comprising a name, a profile picture, and interests of the particular user.

In particular embodiments, each location node 202 may correspond to a location. As an example and not by way of limitation, a location may correspond to a real-world entity, such as a movie theater, a restaurant, a landmark, a city, or another suitable place. An administrative user of a location (such as, for example, the owner/proprietor of the location) may create a location nodes by providing information of the location (e.g., by filling out an online form), causing the social-networking system to create a corresponding location node, and store the location node in one or more of data stores 101. A location node 202 may comprise information of a location provided by an administrative user of the location and information gathered by various systems, including the social-networking system. As an example and not by way of limitation, information of a location may include as a name or a title, one or more images (e.g., an image of cover page of a book), a location (e.g., an address, a geographical location), a website (e.g., an URL address), contact information (e.g., a phone number, an email address), a location capacity, operating hours, other suitable location information, or any combination of such information. In particular embodiments, each location node 202 may comprise one or more data objects corresponding to information associated with the location node 202. In particular embodiments, each location node 202 may correspond to a webpage. As an example and not by way of limitation, in response to a request including a name (or an URL address), system front end 120 may access a corresponding location node (stored in one or more of data stores 101) based on the name, and construct a webpage comprising the name, one or more images, and contact information of the location.

In particular embodiments, an edge 203 connecting a pair of nodes may represent a relationship between the pair of nodes. In particular embodiments, each edge 203 may comprise one or more data objects or attributes corresponding to the relationship between a pair of nodes. As an example and not by way of limitation, a first user may indicate that a second user is a "friend" of the first user. In response to this indication, the social-networking system may transmit a "friend request" to the second user. If the second user confirms the "friend request," the social-networking system may create an edge connecting the first user and the second user in social graph 200, and store the edge in one or more of data stores 101. In the example of FIG. 2, social graph 200 includes an edge indicating a friend relation between user nodes of user "A" and user "B", and an edge indicating a friend relation between user nodes of user "C" and user "B." Although this disclosure describes and FIG. 2 illustrates edges with particular attributes connecting user nodes, this disclosure contemplates edges with any suitable attributes connecting user nodes. As an example and not by way of limitation, an edge may represent a friendship, a business relationship, a fan relationship, a follower relationship, a visitor relationship, a subscriber relationship, a superior/subordinate relationship, a reciprocal relationship, a non-reciprocal relationship, another suitable type of relationship, or two or more such relationships.

Figure 3:
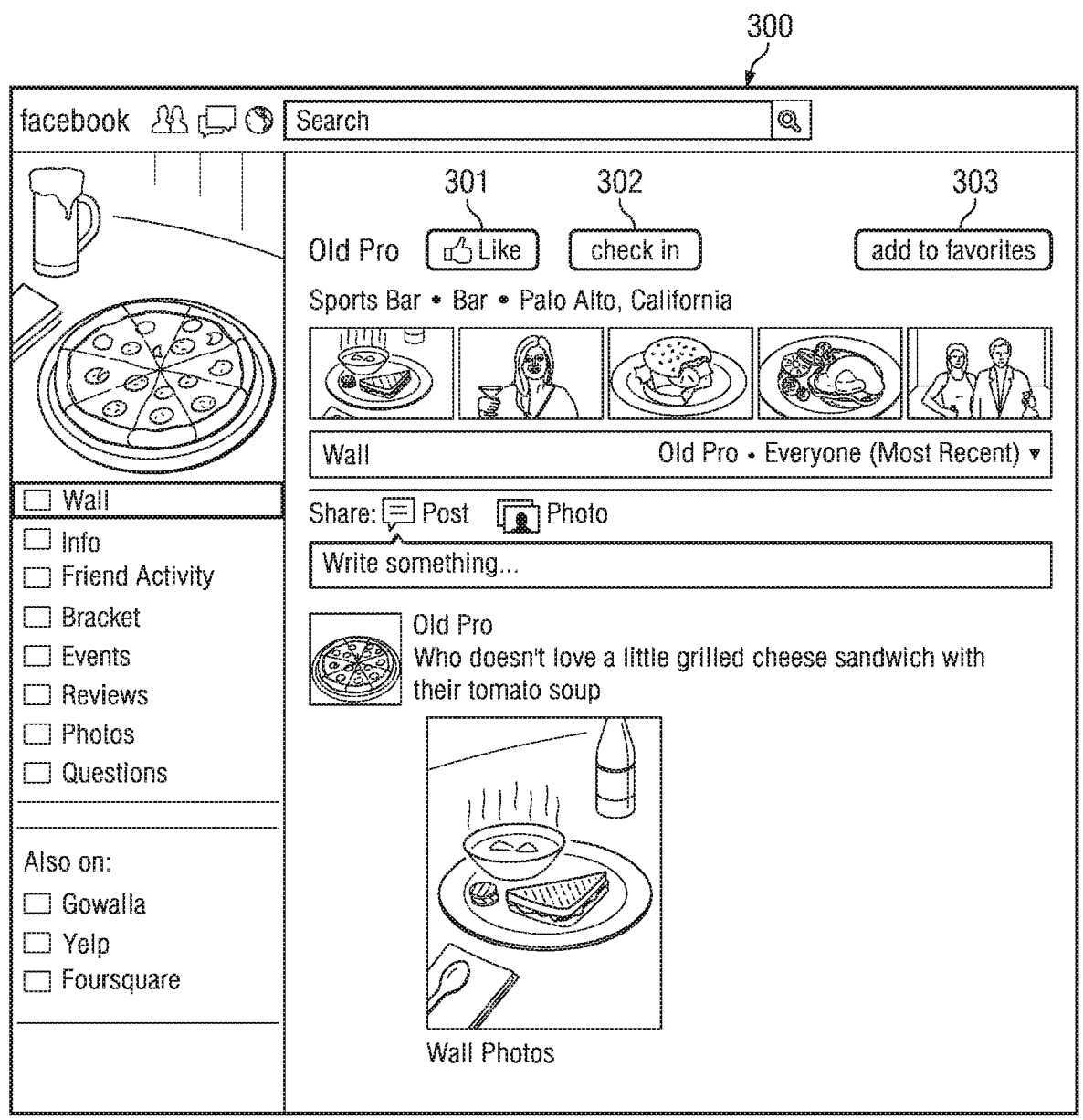
FIG. 3 illustrates an example webpage associated with a location node.

In particular embodiments, the social-networking system may create an edge between a user node and a location node in social graph 200. As an example and not by way of limitation, the social-networking system may construct a webpage 300 corresponding to the location node for the "Old Pro," a sports bar in Palo Alto, Calif., as illustrated in FIG. 3. The webpage 300 may include a selectable "Like" icon 301. A user viewing the webpage 300 (such as, for example, by using a web browser or a special-purpose application hosted by the user's client device 122) may indicate that he likes the location represented by the location node by selecting "Like" icon 301 (such as, for example, by clicking on the icon), which may cause client device 122 to transmit to the social-networking system a message indicating the user's liking of the sports bar. In response to the message, the social-networking system may create an edge between the user and the location node, as illustrated by the "like" edge 203 between the user node of user "B" and the location node of sports bar "Old Pro" in FIG. 2. In particular embodiments, the social-networking system may store the edge in one or more of data stores 101. Although this disclosure describes forming edges in a particular manner, this disclosure contemplates forming edges in any suitable manner. As an example and not by way of limitation, rather than visiting webpage 300 and clicking an icon, a user may use a mobile application or another suitable application that is operable to form an edge between the user's user node and a location node. Moreover, although this disclosure describes particular types of edges, this disclosure contemplates any suitable types of edges.

Social graph 200 may comprise other types of edges between a user node and a location node. In particular embodiments, an edge between a user node and a location node may represent a particular action or activity performed by a user of the user node toward a location of the location node. As an example and not by way of limitation, in addition to a user (user "B") liking a sports bar ("Old Pro"), a user (user "B") may check-in to a place ("Union Square"), as illustrated in FIG. 2. The webpage 300 corresponding to a location node may include, for example, a selectable "check in" icon 302 or a selectable "add to favorites" icon 303. Similarly, by clicking on these icons, the social-networking system may create a "favorite" edge or a "check in" edge (as illustrated in FIG. 2) in response to a user's action corresponding to a respective action. Although this disclosure describes edges with particular attributes connecting user nodes and location nodes, this disclosure contemplates edges with any suitable attributes connecting user nodes and location nodes. Moreover, although this disclosure describes edges between a user node and a location node representing a single relationship, this disclosure contemplates edges between a user node and a location node representing one or more relationships. As an example and not by way of limitation, an edge may represent both that a user likes and has checked in at a particular location. Alternatively, a separate edge could be generated to represent each type of relationship (or multiples of a single relationship) between a user node and a location node.

In particular embodiments, social graph 200 may be used to determine which locations (corresponding to particular location nodes) are relevant to particular users (corresponding to particular user nodes). Location nodes that are connected to a particular user node, either directly by an edge or via one or more nodes, may be considered relevant to the user node. As an example and not by way of limitation, a location node directly connected by an edge to a first user node may be considered relevant to the first user node. As another example and not by way of limitation, a location node connected to second user node may be considered relevant to a first user node if the second user node is an Nth-degree friend of the first user node. Furthermore, in particular embodiments, the closer a second user node is to the first user node, the more relevant the location nodes connected to the second node may be considered to the first user node. That is, the fewer edges separating the first user node from a particular location node, the more relevant that location node may be considered to the first user node. As an example and not by way of limitation, as illustrated in FIG. 2, the location node "Union Square" is directly connected to the user node for User "B," and thus the location "Union Square" may be considered relevant to User "B." As another example and not by way of limitation, the location node "Philz Coffee" is connected to the user node for User "B" via the intermediated user node for User "C," and thus the location "Philz Coffee" may be considered relevant to User "B," but because the location node is not directly connected to the user node for User "B," it may be considered less relevant than a location node that is directly connected to the user node for User "B." As yet another example and not by way of limitation, the location node for "Cafe Venetia" is not connected to the user node for User "B" by any pathway in social graph 200, and thus the location "Cafe Venetia" may not be considered relevant to User "B." Although this disclosure describes determining whether particular location nodes are relevant to particular user nodes in a particular manner, this disclosure contemplates determining whether any suitable location nodes are relevant to any suitable user nodes in any suitable manner.

In particular embodiments, a particular location may correspond to one or more location nodes 202. A social graph may comprise a plurality of location nodes corresponding to a same location (e.g., a same real-world entity). That is, each location node of the several location nodes may correspond to a different webpage that is about the same location. As an example and not by way of limitation, a popular restaurant may have several webpages, such as, for example, a "fan page," an "official page," or a "review page," authored by various users.

Figure 4:
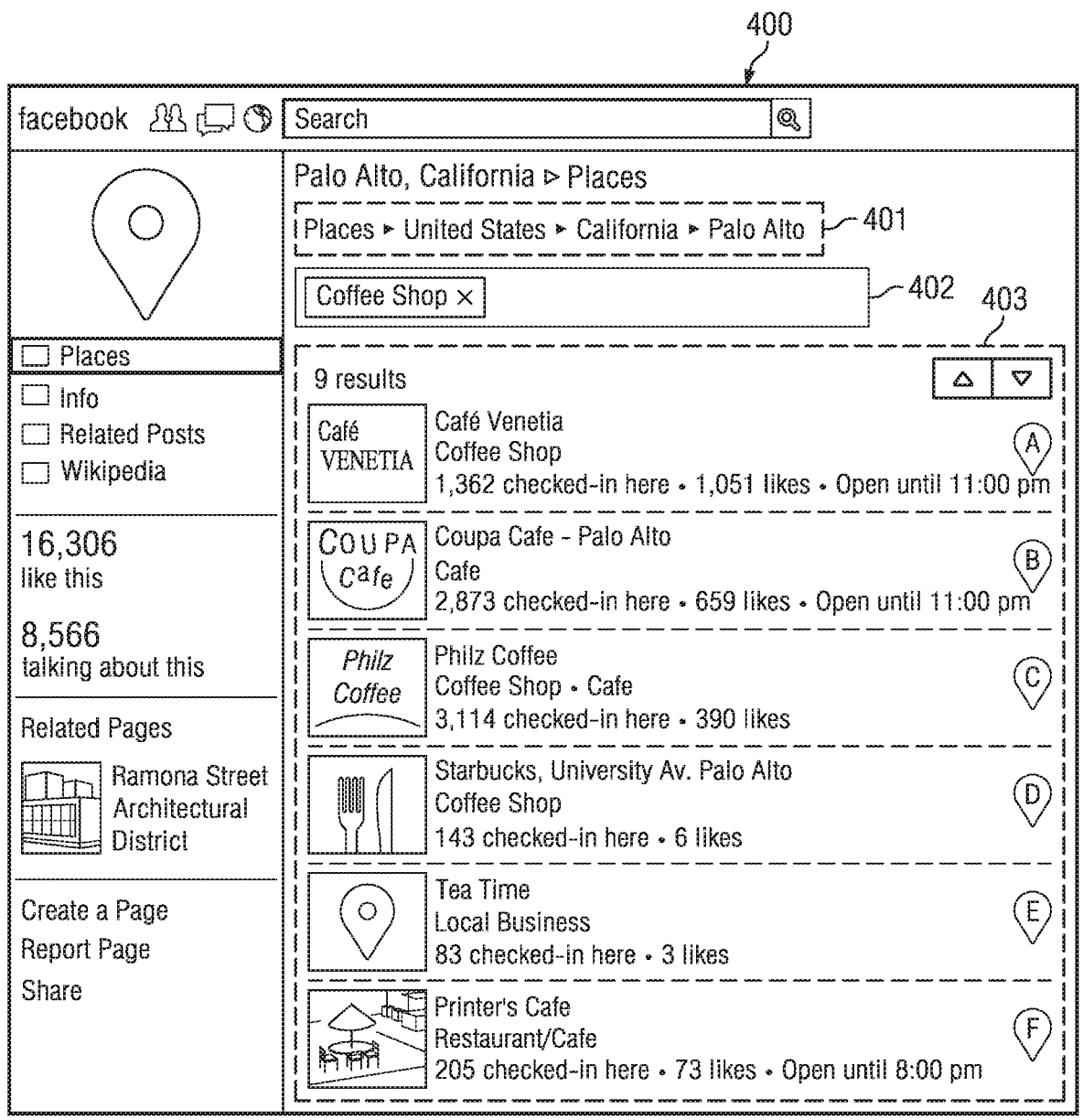
FIG. 4 illustrates an example webpage with a list of location nodes.

In particular embodiments, the social-networking system may identify a set of location nodes based on a search query. FIG. 4 illustrates an example webpage with a list of location nodes. In particular embodiments, the social-networking system may then identify one or more location nodes that substantially match the search query with respect to one or more of their attributes. As an example and not by way of limitation, the social-networking system may receive a search query of "Palo Alto" and "Coffee Shop," which may be entered by a user into search query fields 401 and 402, respectively. Although fields 401 and 402 are illustrated in FIG. 4 and described as particular types of search query fields, this disclosure contemplates any suitable search query fields. The social-networking system may then analyze the location nodes in the social graph 200 to identify one or more location nodes that substantially match the search query. As an example and not by way of limitation, when identifying location nodes that substantially match the search query, the social-networking system may analyze, for example, information associated with the location node (e.g., geographic location, contact information, location capacity, operating hours, etc.), information associated with the social graph (e.g., the number and type of nodes connected to the location node), other suitable information, or any combination of such information. The social-networking system may then transmit the search results to the user who generated the search query. The search results may be displayed to the user, for example, on a webpage such as that displayed in FIG. 4. The particular search results for the search query of "Palo Alto" and "Coffee Shop" are displayed in field 403, which include coffee shops, cafes, a restaurant, and a local business. These search results may also display social-graph information associated with each location node. As an example and not by way of limitation, the search results may display the number and type of edges connected to each location node, such as, for example, the number of "friend" edges, "check in" edges, or "like" edges. Although this disclosure describes identifying particular location nodes based on particular search queries, this disclosure contemplates identifying any suitable location nodes based on any suitable search queries. Moreover, although this disclosure describes particular types of search queries, this disclosure contemplates any suitable types of search queries. Furthermore, although this disclosure describes conducting search queries in a particular manner, this disclosure contemplates conducting search queries in any suitable manner.

In particular embodiments, the social-networking system may determine a value for one or more location nodes based on edges connected to the location node. The social-networking system may determine values for the location nodes identified based on a search query, as described above. The determined value for a location node may be based on a variety of factors, such as, for example, the number of edges connected to the location node, the type of edges connected to the location node, whether the location node and the first user are connected by an edge, whether the location node and user nodes of friends of the first user (or user nodes within a threshold degree of separation of the first user) are connected by edges, when the edges connected to the location node were created, the time of day and the operating hours of the location corresponding to the location node, other suitable information, or any combination of such information. The determined value may be any suitable value on any suitable scale. For illustration purposes, this disclosure discusses values in generic "unit" terms (e.g., 1.0 units, 2.4 units, etc.), this disclosure contemplates values with any suitable type of units. Moreover, for illustration purposes, this disclosure discusses values for location nodes such that larger values are considered more relevant, such as, for example, when ranking search results for display. Although this disclosure describes determining values for particular location nodes, this disclosure contemplates determining values for any suitable location node. Moreover, although this disclosure describes determining particular values for location nodes, this disclosure contemplates determining any suitable values for location nodes. Furthermore, although this disclosure describes determining a value for a location node based on edge connections in a particular manner, this disclosure contemplates determining a value for a location node based on edge connections in any suitable manner.

In particular embodiments, the social-networking system may determine a value for a location node based on the social relevancy of the location node to a first user. A location node that is directly connected to a first user, or connected to friends of the first user, may be considered socially relevant to the first user. A location node that is connected to a more distant friend of the first user (e.g., 2nd-degree friends, 3rd-degree friends, and so on) may be considered less socially relevant to the first user. Finally, a location node that is not connected to the first user node by any path in the social graph may be considered minimally or not socially relevant to the first user. In particular embodiments, the social-networking system may identify a set of edges between a location node and a first user node and then determine a value for the node based on the set of edges. Location nodes that are directly connected to the first user node may be valued more highly than location nodes that are not connected to the first user node. As an example and not by way of limitation, referencing FIG. 2, if User "F" is searching for "Coffee Shops," the location node for "Cafe Venetia" may be given a value of 1.0 units because it is directly connected to the user node for User "F," while the location node for "Philz Coffee" may be given a value of zero because it is not connected to the user node for User "F." In particular embodiments, the social-networking system may identify a set of edges between a location node and one or more second user nodes and then determine a value for the node based on the set of edges. Location nodes with more edges, regardless of which user nodes they are connected to (e.g., the first user, friends of the first user, or other miscellaneous users), may be valued more highly than location nodes with fewer edges. As an example and not by way of limitation, referencing FIG. 2, if User "B" is searching for "Coffee Shops," the location nodes for "Cafe Venetia," "Coupa Cafe," and "Philz Coffee" may be valued highly (and thus ranked highly in the search results in field 403) because each location node has over 1000 "checked in" edges and several hundred "like" edges. In particular embodiments, the social-networking system may determine a value for a location node based on a number of edges between the location node and one or more first user's social contacts. That is, the social-networking system may look at how user nodes within the social graph of a first user are connected to a particular location node, for example, by looking at the number and type of edges connecting a user's friends to the particular location node. As an example and not by way of limitation, the social-networking system may determine a value of 2.0 units for a location node directly connected by an edge to the first user, a value of 1.0 units for a location node if the location node has 10 or more edges connecting it to 1st-degree friends of the first user (i.e., user nodes directly connected by an edge to the first user), a value of 0.7 units if the location node has 10 or more edges connecting it to 2nd-degree friends of the first user, and so on. These values may be cumulative, such that a location node with 10 or more 1st-degree edges and 10 or more 2nd-degree edges would have a value of 1.7 units. In particular embodiments, the social-networking system may only value edges from user nodes that are within a threshold degree of separation of the first user in the social graph 200. As an example and not by way of limitation, if the threshold degree of separation is one degree, the social-networking system may determine a value of 1.0 units for a location node if the location node has 10 or more edges connecting it to 1st-degree friends of the first user and a value of zero for a location node with edges from 2nd-degree and higher friends of the first user. In particular embodiments, the social-networking system may determine a value for a location node based on the types of edges connecting the location node to a user's friends. Edges with particular attributes may be given more value than other types of edges. As an example and not by way of limitation, for a location node associated with the location "Philz Coffee," the social-networking system may give more weighting to edges of "like" than edges of "checked in." While counting a number of edges between a location node and user nodes that are friends of a first user, the social-networking system may determine a value for a "like" edge as 2.0 units, while determining a value for a "checked in" edge as 1.2 units. Although this disclosure describes determining values for location nodes based on social relevancy in a particular manner, this disclosure contemplates determining values for location nodes based on social relevancy in any suitable manner.

In particular embodiments, the social-networking system may determine a value for a location node based on the based on the number and types of edges connected to the location node. A particular location node may be connected to one or more other nodes by one or more edges, and each edge may have particular attributes. In particular embodiments, the social-networking may determine a value for a location node based on the number of edges connected to the location node. Location nodes may be connected to other nodes by one or more edges, and the number of edges connected to a location node may be considered when determining a value for the location node. That is, the social-networking system may determine a value for a location node based on a level of engagement by users, as measured by a number of edges (i.e., actions) between the location node and user nodes. Location nodes with more edges may be given a greater value. As an example and not by way of limitation, a location node with 50 edges may be given a value of 5.0 units, while a location node with 30 edges may be given a value of 2.4 units. As another example and not by way of limitation, the social-networking system may assign a score of 1.0 units to a location node if the location node has more than 100 edges connecting to user nodes, a score of 0.7 units if the location node has more than 50 edges connecting to user nodes, or a score of 0.5 units if the location node has 50 edges or less connecting to user nodes. In particular embodiments, the value given based on the number of edges may be normalized. As an example and not by way of limitation, the value for a location node may be normalized based on capacity of the location associated with the location node. For example, a first location node with 100 edges and a capacity of 100 people may be given the same value as a second location node with 10 edges and a capacity of 10 people. In particular embodiments, the social-networking system may determine a value for a location node based on the attributes of the edges connected to the location node. As discussed above, edges may have various attributes, and edges with particular attributes may be given more value than other types of edges. The social-networking system may identify the edges connected to a particular location node and the attributes of those edges and then determine a value based on the attributes of the edges. As an example and not by way of limitation, for a location node associated with the location "Union Square," the social-networking system may give more weighting to edges of "checked in" than edges of "like." While counting a number of edges between a location node and user nodes, the social-networking system may determine a value for a "checked in" edge as 1.5 units, while determining a value for a "like" edge as 1.0 units. Although this disclosure describes determine values for a location node based on edge information in a particular manner, this disclosure contemplates determining values for a location nodes based on edge information in any suitable manner.

In particular embodiments, the social-networking system may determine a value for a location node based on advertising sponsorship associated with the location node. An advertiser (such as, for example, the owner or propriety of a location corresponding to a location node) may sponsor a particular location node such that the location node is given a higher value and/or ranked better by the social networking system. As an example and not by way of limitation, a location node with advertising sponsorship may automatically be given a value to ensure that it is transmitted or displayed to a user (such as, for example, being on the first page of search results, or near the top of search results). As another example and not by way of limitation, a first location node and a second location node may be given the same value based on edges connected to the location node alone, but if the value is further determined based on advertising sponsorship, whichever node has advertising sponsorship may be given an increased value, thus allowing it to be ranked higher. Although this disclosure describes determining a value for a location node based on advertising sponsorship in a particular manner, this disclosure contemplates determining a value for a location node based on advertising sponsorship in any suitable manner.

In particular embodiments, the social-networking system may determine a value for a location node based on time stamps associated with the edges connected to the location node. Edges that were generated more recently may be weighted more heavily when determining a value than edges that were generated in the past. As an example and not by way of limitation, the social-networking system may assign a score of 1.0 to a location node if 100 edges were connected to that location node in the past week, while the social-networking system may assign a score of 0.5 to a location node if 100 edges were connected to that location node in the past month. As another example and not by way of limitation, a location node may be given a score of 1.0 for having 1000 edges connected to it in the past week, a score of 0.8 for having 1000 edges connected to it in the past two weeks, a score of 0.6 for having 1000 edges connected to it in the past month, and so on. Although this disclosure describes determining a value for a location node based on time stamps associated with edges in a particular manner, this disclosure contemplated determining a value for a location node based on time stamps associated with edges in any suitable manner.

In particular embodiments, the social-networking system may determine a value for a location node based on the operating hours for the location corresponding to the location node. The social-networking system may analyze whether a location corresponding to the location node is currently open, will be open at a particular time (such as, for example, based on particular search criteria), or closed, by referencing any operating hours information available (such as, for example, from location information associated with the location node). As an example and not by way of limitation, a location node for a location that is currently open may be given a greater value than a location node for a location that is currently closed. As another example and not by way of limitation, if a first user is searching on a Friday for a location that is open on Sunday, the social-networking system may increase the value for all location nodes with operating hours indicating the locations corresponding to nodes are open on Sunday while decreasing the value for all location nodes that are not open on Sunday. Although this disclosure describes determining a value for a location node based on operating hours in a particular manner, this disclosure contemplates determining a value for a location node based on operating hours in any suitable manner.

In particular embodiments, the social-networking system may determine a value for a location node based on traffic data of the location node's corresponding webpage. As an example and not by way of limitation, the social-networking system may detect a visit to a location node's corresponding webpage, such as the webpage illustrated in FIG. 3, when the social-networking system receives a request to serve the corresponding webpage. As an example and not by way of limitation, the social-networking system may detect a visit to a location node's corresponding webpage when the social-networking system receives a request to serve content of a selectable icon incorporated in the location node's corresponding webpage. The social-networking system may accumulate and store in one or more of data stores 101 a number of visits to a webpage corresponding to a location node. The social-networking system may access one or more of data stores 101 for a number of visits for each of the second location nodes, and assign a score to each of the second location nodes based on the numbers of visits. As an example and not by way of limitation, the social-networking system may assign a score of 1.0 units to a location node if the location node's corresponding webpage has been visited for over 10,000 times, a score of 0.8 if the corresponding webpage has been visited for over 5,000 times, a score of 0.6 if the corresponding webpage has been visited for over 1,000 times, or a score of 0.4 if the corresponding webpage has been visited for 1,000 times or less. Although this disclosure describes determining a value for a location node based on traffic data in a particular manner, this disclosure contemplates determining a value for a location node based on traffic data in any suitable manner.

In particular embodiments, the social-networking system may determine a value for a location node based on one or more factors, as described above, including social-graph information, user information, location information, etc.

These determined values may be cumulative with each other. The determined value for each factor may be additive, multiplicative, etc., with determined values for other factors. As an example and not by way of limitation, a social-networking system may give a value of 1.0 to a location node having 10 or more edges connected to it, and may give a value of 0.8 to a location node corresponding to a location that is currently open. Thus, a location node that is currently open and has 10 or more edges may be given a value of 1.8. In particular embodiments, values determined based on particular factors may be weighted differently. Using the previous example, a location node with 10 or more edges that is currently open may be given a value of a*(1.0)+b*(0.8), where a and b are weightings that may be assigned to the particular factors. Although this disclosure describes determining discrete values for location nodes based on particular factors, this disclosure contemplates determining non-discrete values for location node based on a variety of factors.

In particular embodiments, the social-networking system may transmit to the first user the determined value for each location node. The value may be displayed directly (such as, for example, by showing the exact determined value for each node), or indirectly (such as, for example, by ranking location nodes relative to each other). As an example and not by way of limitation, the social-networking system may rank higher-valued nodes higher than lower-valued nodes, such that the node with the highest value is ranked first, and so on. In particular embodiments, the social-networking system may transmit information of a particular set of location nodes. As an example and not by way of limitation, the social-networking system may present to the first user information of the location nodes with a respective score greater than a pre-determined value (e.g., 0.5). As another example and not by way of limitation, the social-networking system may rank the location nodes based on respective scores, and present to the first user information of top-ranked location nodes (e.g., top 9). Information of particular location nodes presented to the first user may comprise one or more images and website names of the particular location nodes. Information of particular location nodes presented to the first user may also comprise user profile pictures of the first user's social contacts whose corresponding user nodes having one or more edges (e.g., "like," "check in," etc.) connected to one or more of the location nodes. Information of the particular location nodes presented to the first user may be included in the webpage corresponding to the first location node. FIG. 4 illustrates an example webpage with a list of location nodes in field 403 that are ranked based on their determined value. Although this disclosure describes transmitting values of location nodes in a particular manner, this disclosure contemplated transmitting values of location nodes in any suitable manner.

Figure 5:
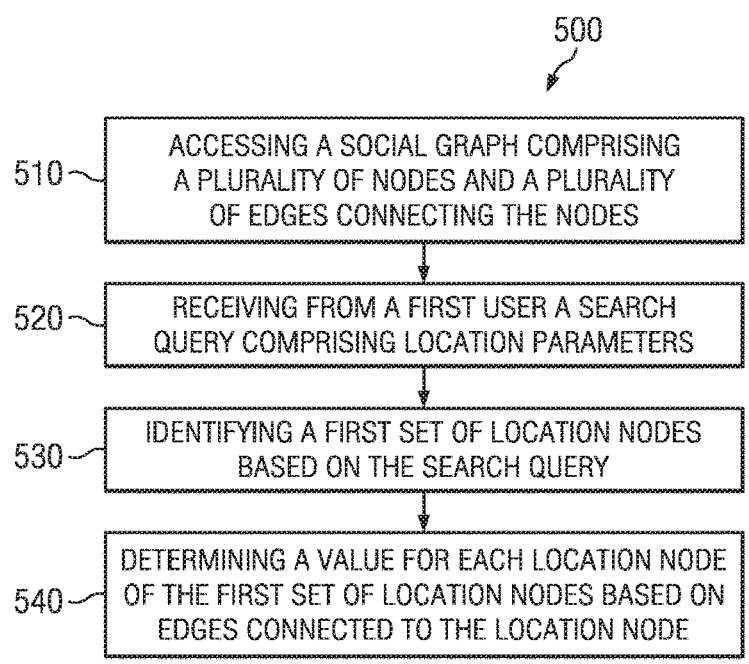
FIG. 5 illustrates an example method.

FIG. 5 illustrates an example method 500 for implementing particular embodiments. The method begins at step 510, where the social-networking system accesses a social graph comprising a plurality of nodes and a plurality of edges connecting the nodes. The plurality of nodes may comprise a first user node corresponding to a first user of an online social network and a plurality of second user nodes corresponding to a plurality of second users of the online social network, respectively. The plurality of nodes may also comprise one or more location nodes corresponding to one or more locations, respectively, wherein each location node is connected to one or more user nodes by one or more edges. At step 520, the social-networking system may receive from the first user a search query comprising location parameters. At step 530, the social-networking system may identify a first set of location nodes based on the search query. At step 540, the social-networking system may determine a value for each location node of the first set of location nodes based on edges connected to the location node. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Figure 6:
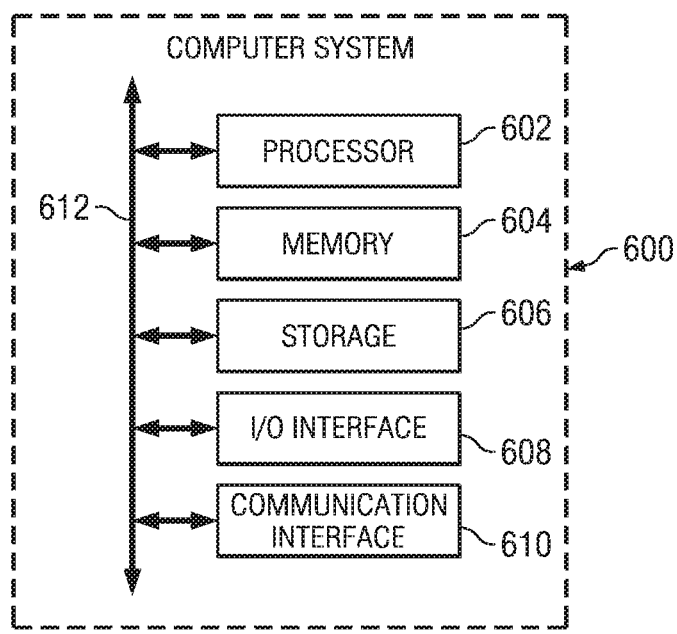
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 7:
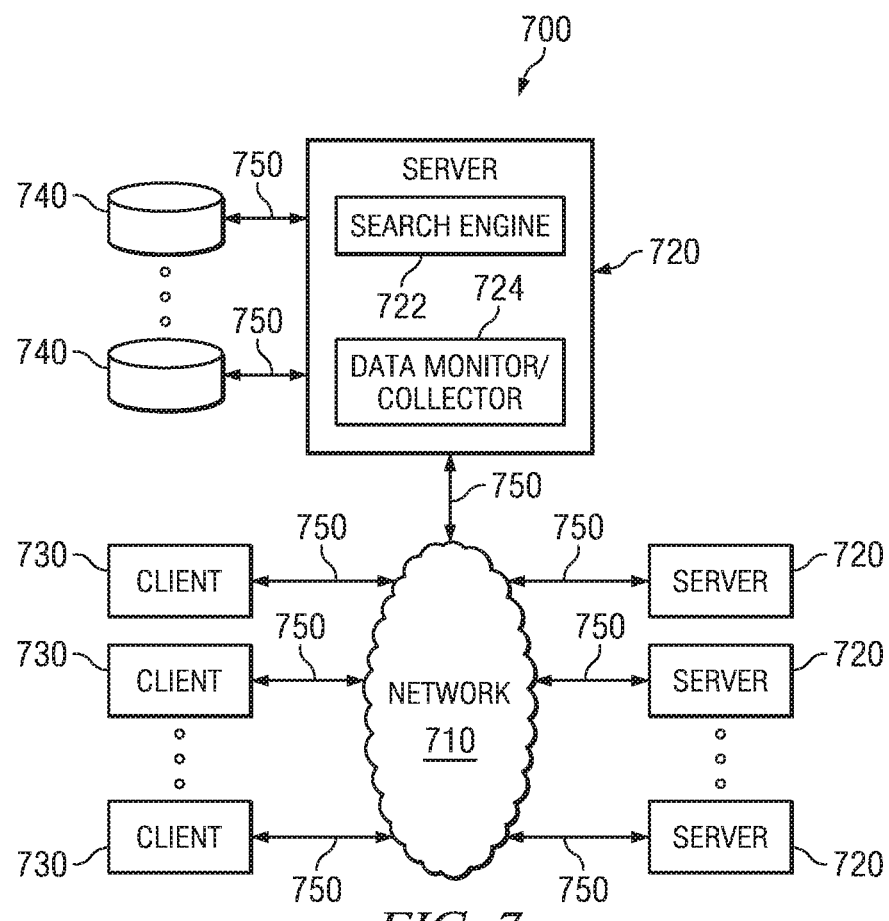
FIG. 7 illustrates an example network environment.

FIG. 7 illustrates an example network environment 700. This disclosure contemplates any suitable network environment 700. As an example and not by way of limitation, although this disclosure describes and illustrates a network environment 700 that implements a client-server model, this disclosure contemplates one or more portions of a network environment 700 being peer-to-peer, where appropriate. Particular embodiments may operate in whole or in part in one or more network environments 700. In particular embodiments, one or more elements of network environment 700 provide functionality described or illustrated herein. Particular embodiments include one or more portions of network environment 700. Network environment 700 includes a network 710 coupling one or more servers 720 and one or more clients 730 to each other. This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 couple servers 720 and clients 730 to network 710 or to each other. This disclosure contemplates any suitable links 750. As an example and not by way of limitation, one or more links 750 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 750. In particular embodiments, one or more links 750 each includes an intranet, an extranet, a VPN, a LAN, a WLAN, a WAN, a MAN, a communications network, a satellite network, a portion of the Internet, or another link 750 or a combination of two or more such links 750. Links 750 need not necessarily be the same throughout network environment 700. One or more first links 750 may differ in one or more respects from one or more second links 750.

This disclosure contemplates any suitable servers 720. As an example and not by way of limitation, one or more servers 720 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 720 includes hardware, software, or both for providing the functionality of server 720. As an example and not by way of limitation, a server 720 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 730, the web server may communicate one or more such files to client 730. As another example, a server 720 that operates as a mail server may be capable of providing e-mail services to one or more clients 730. As another example, a server 720 that operates as a database server may be capable of providing an interface for interacting with one or more data stores (such as, for example, data stores 740 described below). Where appropriate, a server 720 may include one or more servers 720; be unitary or distributed; span multiple locations; span multiple machines; span multiple datacenters; or reside in a cloud, which may include one or more cloud components in one or more networks.

In particular embodiments, one or more links 750 may couple a server 720 to one or more data stores 740. A data store 740 may store any suitable information, and the contents of a data store 740 may be organized in any suitable manner. As an example and not by way or limitation, the contents of a data store 740 may be stored as a dimensional, flat, hierarchical, network, object-oriented, relational, XML, or other suitable database or a combination or two or more of these. A data store 740 (or a server 720 coupled to it) may include a database-management system or other hardware or software for managing the contents of data store 740. The database-management system may perform read and write operations, delete or erase data, perform data deduplication, query or search the contents of data store 740, or provide other access to data store 740.

In particular embodiments, one or more servers 720 may each include one or more search engines 722. A search engine 722 may include hardware, software, or both for providing the functionality of search engine 722. As an example and not by way of limitation, a search engine 722 may implement one or more search algorithms to identify network resources in response to search queries received at search engine 722, one or more ranking algorithms to rank identified network resources, or one or more summarization algorithms to summarize identified network resources. In particular embodiments, a ranking algorithm implemented by a search engine 722 may use a machine-learned ranking formula, which the ranking algorithm may obtain automatically from a set of training data constructed from pairs of search queries and selected Uniform Resource Locators (URLs), where appropriate.

In particular embodiments, one or more servers 720 may each include one or more data monitors/collectors 724. A data monitor/collection 724 may include hardware, software, or both for providing the functionality of data collector/collector 724. As an example and not by way of limitation, a data monitor/collector 724 at a server 720 may monitor and collect network-traffic data at server 720 and store the network-traffic data in one or more data stores 740. In particular embodiments, server 720 or another device may extract pairs of search queries and selected URLs from the network-traffic data, where appropriate.

This disclosure contemplates any suitable clients 730. A client 730 may enable a user at client 730 to access or otherwise communicate with network 710, servers 720, or other clients 730. As an example and not by way of limitation, a client 730 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 730 may be an electronic device including hardware, software, or both for providing the functionality of client 730. As an example and not by way of limitation, a client 730 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 730 may include one or more clients 730; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of a network environment:

receiving, from a client device associated with the network environment, a search query comprising location parameters;

identifying one or more locations matching the search query, each location corresponding to a particular record in a data store of the network environment;

accessing, from the data store for each identified location, the particular record corresponding to the location, wherein the record indicates actions by users performed on the network environment with respect to the location;

determining, for each identified location, a plurality of counts of a plurality of types of actions from a plurality of users based on the record corresponding to the location;

generating a search-results page comprising one or more references corresponding to one or more of the identified locations, respectively, wherein each reference displays one or more of the determined counts of the plurality of types of actions for the respective identified location, and wherein the references are listed in ranked order based at least in part on their respective counts of the plurality of types of actions; and sending, to the client device, instructions for presenting the search-results page to the first user.

2. The method of claim 1, wherein the references are listed in ranked order further based on advertising sponsorship associated with the identified location.

3. The method of claim 1, wherein the references are listed in ranked order further based on time stamps associated with the type of actions corresponding to the identified location.

4. The method of claim 1, wherein the references are listed in ranked order further based on a value for each identified location, and wherein the value for each identified location is determined by:

identifying a first set of edges between a node in a social graph corresponding to the identified location and a node corresponding to a first user associated with the client device within the social graph;

identifying a second set of edges between the node corresponding to the identified location and one or more nodes corresponding to friends of the first user in the social graph; and determining the value for the identified location based on the first set of edges and the second set of edges.

5. The method of claim 1, wherein the references are listed in ranked order further based on a value for each identified location, and wherein the value for each identified location is determined by:

identifying one or more second users of the online social network who are friends of a first user associated with the client device;

identifying a first set of edges between a node in a social graph corresponding to the identified location and one or more nodes corresponding to friends of the first user in the social graph; and determining the value for the identified location based on the first set of edges.

6. The method of claim 1, wherein the references are listed in ranked order further based on a value for each identified location, and wherein the value for each identified location is determined by:

identifying a number of edges connected to a node in a social graph corresponding to the identified location; and determining the value for the identified location based on the number of edges connected to the node corresponding to the identified location.

7. The method of claim 1, wherein the references are listed in ranked order further based on a value for each identified location, and wherein the value for each identified location is determined by:

identifying an operating hours for the location; and determining the value for the identified location based on operating hours for the identified location.

8. The method of claim 1, wherein the references are listed in ranked order further based on a value for each identified location, and wherein the value for each identified location is determined by:

identifying one or more attributes for each of one or more edge connected to a node in a social graph that corresponds to the identified location; and determining the value for the identified location based on the attributes of the edges connected to the node corresponding to the identified location.

9. The method of claim 1, wherein the search-results page is a user interface of a native application associated with the online social network on the client device.

10. The method of claim 1, wherein the search-results page is a webpage of the online social network accessed by a browser client on the client device.

11. The method of claim 1, wherein the one or more types of actions comprise one or more of: forming a friendship, forming a business relationship, forming a fan relationship, forming a follower relationship, forming a visitor relationship, forming a subscriber relationship, forming a superior/subordinate relationship, forming a reciprocal relationship, or forming a non-reciprocal relationship.

12. The method of claim 1, further comprising accessing a social graph comprising a plurality of nodes and a plurality of edges connecting the nodes, each edge between two nodes representing a single degree of separation between the two nodes, the plurality of nodes comprising:

a first node corresponding to a first user associated with the client device;

a plurality of second nodes corresponding to a plurality of second users of the network environment, respectively; and a plurality of third nodes corresponding to a plurality of locations, respectively.

13. The method of claim 12, wherein each second node is within a threshold degree of separation from the first node.

14. The method of claim 12, wherein each edge comprises one or more attributes.

15. The method of claim 12, further comprising determining a value for each identified location based on a number of edges connected to the node corresponding to the identified location and the types of actions represented by the edges connected to the node corresponding to the identified location.

16. The method of claim 15, wherein the references are listed in ranked order further based on their respective determined values.

17. The method of claim 12, wherein each edge connecting a third node to a first or second node represents a particular type of action with respect to the location corresponding to the third node.

18. The method of claim 17, wherein the type of action represented by the edge is selected from a group consisting of: forming a friendship, forming a business relationship, forming a fan relationship, forming a follower relationship, forming a visitor relationship, forming a subscriber relationship, forming a superior/subordinate relationship, forming a reciprocal relationship, and forming a non-reciprocal relationship.

19. A system comprising: one or more processors; and a memory coupled to the processors comprising instructions executable by the processors, the processors operable when executing the instructions to:

receive, from a client device associated with a network environment, a search query comprising location parameters;

identify one or more locations matching the search query, each location corresponding to a particular record in a data store of the network environment;

access, from the data store for each identified location, the particular record corresponding to the location, wherein the record indicates actions by users performed on the network environment with respect to the location;

determine, for each identified location, a plurality of counts of a plurality of types of actions from a plurality of users based on the record corresponding to the location;

generate a search-results page comprising one or more references corresponding to one or more of the identified locations, respectively, wherein each reference displays one or more of the determined counts of the plurality of types of actions for the respective identified location, and wherein the references are listed in ranked order based at least in part on their respective counts of the plurality of types of actions; and send, to the client device, instructions for presenting the search-results page.

20. One or more computer-readable non-transitory storage media embodying software that is operable when executed to:

receive, from a client device associated with a network environment, a search query comprising location parameters;

identify one or more locations matching the search query, each location corresponding to a particular record in a data store of the network environment;

access, from the data store for each identified location, the particular record corresponding to the location, wherein the record indicates actions by users performed on the network environment with respect to the location;

determine, for each identified location, a plurality of counts of a plurality of types of actions from a plurality of users based on the record corresponding to the location;

generate a search-results page comprising one or more references corresponding to one or more of the identified locations, respectively, wherein each reference displays one or more of the determined counts of the plurality of types of actions for the respective identified location, and wherein the references are listed in ranked order based at least in part on their respective counts of the plurality of types of actions; and send, to the client device, instructions for presenting the search-results page.

\* \* \* \* \*